(12) United States Patent
Marx et al.

(10) Patent No.: US 6,969,490 B2
(45) Date of Patent: Nov. 29, 2005

(54) DEVICE FOR THE CONTINUOUS PROCESS FOR THE PRODUCTION OF CONTROLLED ARCHITECTURE MATERIALS

(75) Inventors: Ryan E. Marx, Cottage Grove, MN (US); James M. Nelson, Roseville, MN (US); Shivshankar Venkataramani, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/606,916

(22) Filed: Jun. 26, 2003

(65) Prior Publication Data

US 2004/0265188 A1 Dec. 30, 2004

(51) Int. Cl.⁷ ................................................ G05D 7/00
(52) U.S. Cl. ...................... 422/110; 422/111; 422/193; 526/62; 526/72; 700/266; 700/268
(58) Field of Search ................................ 422/110, 111, 422/193; 526/62, 72; 700/266, 268

(56) References Cited

U.S. PATENT DOCUMENTS

| | | |
|---|---|---|
| 4,276,261 A | 6/1981 | Kerscher et al. |
| 4,321,344 A | 3/1982 | Sumitani et al. |
| 5,166,260 A | 11/1992 | Buonerba et al. |
| 5,313,009 A | 5/1994 | Guenkel et al. |
| 5,599,450 A | 2/1997 | Li et al. |
| 5,644,007 A | 7/1997 | Davidson et al. |
| 5,739,219 A | 4/1998 | Fischer et al. |
| 5,935,489 A | 8/1999 | Hershkowitz et al. |
| 6,153,149 A * | 11/2000 | Rabitz et al. ............... 422/108 |
| 6,448,353 B1 | 9/2002 | Nelson et al. |
| 2003/0035756 A1 | 2/2003 | Nelson et al. |

FOREIGN PATENT DOCUMENTS

| | | |
|---|---|---|
| DE | 37 305 52 | 3/1989 |
| EP | 0 763 066 B1 | 3/1997 |
| EP | 0 936 225 A1 | 8/1999 |
| EP | 1 209 170 A | 5/2002 |

OTHER PUBLICATIONS

C.G. Hill, Jr., "Basic Concepts in Reactor Design and Ideal Reactor Models", An Introduction to Chemical Engineering Kinetics & Reactor Design, (1977), pp. 251–252, John Wiley & Sons, Inc.

* cited by examiner

Primary Examiner—William Cheung
(74) Attorney, Agent, or Firm—Kent S. Kokko

(57) ABSTRACT

The device of the present invention delivers reactants to a reaction zone in a plug flow reactor. The feedblock encircles the reaction zone. Reactants enter the feedblock through an inlet port leading to a manifold for the delivery of reactants into a plurality of feed ports that are in connection with the reaction zone of a plug flow reactor. The invention additionally encompasses plug flow reactors including one or more feedblocks and the method of utilizing the feedblock for the reduction of radial variation in concentration upon entry of a reactant into the reaction zone.

10 Claims, 4 Drawing Sheets

DEVICE FOR THE CONTINUOUS PROCESS FOR THE PRODUCTION OF CONTROLLED ARCHITECTURE MATERIALS

BACKGROUND OF THE INVENTION

The present invention relates to a device and method that can be used to enhance circumferential or radial dispersion of reactants, minimize diversity in products and reduce reactor fouling by minimizing the radial variation in concentration in a plug flow reactor.

Plug flow reactors can be used for a wide range of reactions. Reactions can be based on chemical or physical reactions to form compounds, polymers, small molecule materials, blends, alloys, biologically active species, or biological species. Chemical reactions include both organic and inorganic reactions. Blends and alloys can also be made in a plug flow reactor for example by physically mixing components. The blends or alloys may comprise, for example, polymers mixed with inorganics such as silica, carbon black, or clay forming nanocomposite type materials or other reinforced materials.

Plug flow reactors may be used with various polymer synthesis methodologies including any step-growth polymerization mechanisms, for example, polycondensations; or chain-growth polymerization mechanisms, for example, anionic, cationic, free-radical, living free radical, coordination, group transfer, metallocene, ring-opening, and the like. (See Odian, "Principles of Polymerization" 3rd Ed., Wiley-Interscience, 1991, NY, N.Y.). The synthesis of homopolymers; random copolymers; block copolymers; star-branched homo-, random, and block copolymers; and end-functionalized polymers is possible by using appropriate polymerization techniques.

Various types of polymers can be prepared from different monomeric materials, the particular type formed being generally dependent upon the procedures followed in contacting the materials during polymerization. For example, random copolymers can be prepared by the simultaneous reaction of the copolymerizable monomers. Block copolymers are formed by sequentially polymerizing different monomers. The ability to form different types of polymers through control of the polymerization is referred to generally as controlled architecture. Controlled architecture polymers are designed with various types or variations of morphology including: linear, branched, star, combination network; variations in composition including: block copolymer, random copolymer, homopolymer, graft copolymer, tapered or gradient copolymer, and/or variations in functionality including: end, site specific, telechelic, multifunctional, and macromonomers.

Variation in local concentrations of reactants within plug flow reactor systems leads to greater diversity in the products. For example, the products of any given polymerization reaction are a mixture of polymer molecules of different molecular weights related to the length and composition of the individual chains. Living anionic polymerization reactions are very fast and exothermic. Therefore the polymer chains will tend to grow longer in localities within a plug flow reactor where the concentration of reactant monomer is relatively higher. The resulting disparity in lengths of the different polymer chains increases the polydispersity index (PDI), a reflection of poor uniformity between individual polymer chains produced by the reaction.

Block copolymers as an example of controlled architecture, are known to self assemble into 3-dimensional morphologies, which are tunable by variations and constituent block sizes and overall molecular weights. In order to achieve a uniform morphology, all of the polymer chains should have a uniform length in composition. This uniformity is reflected in the polydispersity index (PDI). The uniformity also relates and controls the order/disorder transition (crystalline/amorphous properties) of the block copolymer system. Compositional gradients also adversely affect block copolymer properties. For example, in the synthesis of a block copolymer with a 50/50 mole % composition, there could be a statistical mixture of compositions around that desired point which average to 50:50, although composed of a broader distribution, for example 45:55, 46:54, or 60:40 etc. In products with controlled architecture, variance is preferably minimized.

A plug flow reactor equipped with a single point delivery system can be plagued by reactor fouling, due to concentration gradients in 3D space. This increases downtime and increases the need to clean the reactor, thus decreasing production rates and productivity. Fouling can occur due to solubility differences associated with high and low molecular weight systems. This effect can be especially prevalent in the synthesis of amphiphilic block copolymers or polymer containing highly polar segments. These materials tend to micellize and exhibit interesting or challenging solubilities and adhesion to materials (i.e. the glass reactor and metal paddles). Examples of amphiphilic blocks are high acid content polymers which show decreased solubility in non-aqueous solvents and vinyl pyridine-containing block copolymers where high vinyl pyridine content block copolymers display limited solubility in typical polymerization solvents such as cyclohexane and toluene.

SUMMARY OF THE INVENTION

The device of the present invention delivers reactants to a reaction zone in a plug flow reactor. The device is a feedblock that encircles the reaction zone. Reactants enter the feedblock through an inlet port leading to a manifold inside the feedblock for the delivery of the reactants to a plurality of feed ports that are in connection with the reaction zone of the plug flow reactor. The feed ports are disposed to surround the reaction zone in an equidistant manner for delivery of the reactants with minimized variation in radial reactant concentration. The invention additionally encompasses plug flow reactors including one or more feedblocks and the method of utilizing the feedblock for the reduction of radial variation in concentration upon entry of a reactant into the reaction zone. The PDI of polymers made with plug flow reactors can be lowered with use of the device and method of the present invention.

DETAILED DESCRIPTION

Figure 1:
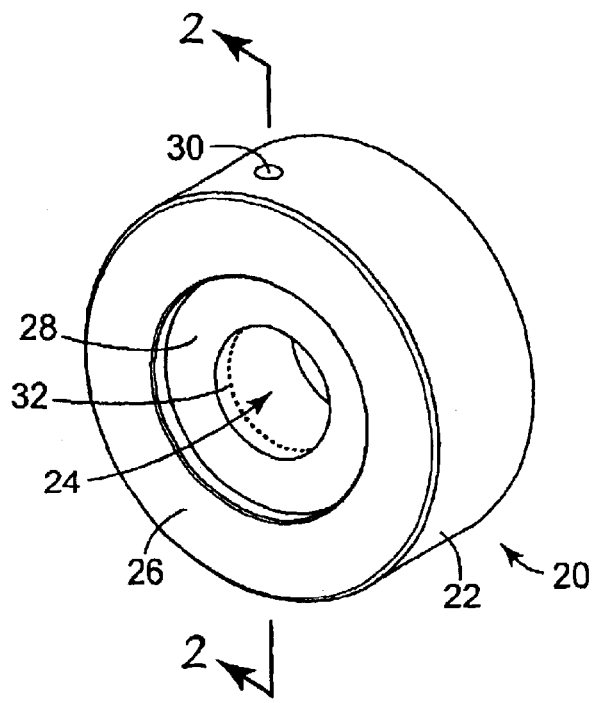
FIG. 1 is a perspective view of an example feedblock device of the present invention.

The methods of the present invention improve the uniformity of reactant delivery into a plug flow reactor, thereby minimizing the diversity in the resulting products. The device of the present invention includes a feedblock for uniform delivery of reactants or other materials into the reaction zone of a plug flow reactor. The feedblock converts one or more single point inlet ports on the outside of the reactor into a plurality of feed ports arranged in an equidistant manner around a circumference of the reaction zone inside the reactor. Use of the feedblock in reactions carried out in plug flow reactors reduces concentration variations, product compositional variability, reactor fouling, and improves radial mixing.

Product diversity in the production of controlled architecture materials is not desired. Preferably, the product, for example a polymer, will have uniform molecular weight and uniform morphology. Molecular weight of a polymer is frequently expressed by both a number average and a weight average molecular weight. The ratio of the weight average molecular weight to the number average molecular weight is a measure of the polydispersity of a polymer sample. Therefore, in polymeric materials, reduction of the PDI demonstrates improved monodispersity or uniformity of the product.

The feedblock is used to introduce fluid reactants or materials in a wide variety of reactions carried out in plug flow reactors. Reactants include, but are not limited to: monomers, solvent, slurries, macromonomers, quenching agents, coupling agents, deprotection agents, catalysts, and initiators. Reaction is defined broadly to include a wide variety of chemical and physical reactions. For example, the feedblock may be applied to the production of polymeric materials, small-molecule organic materials, inorganics (such as nanoparticles or modified silica), blended materials comprising at least one polymeric component, biological materials, and biologically active materials in plug flow reactors. Additional information regarding the application of plug flow reactors in a variety of reactions can be found in U.S. Patent Application Publication No. US 2003/0035756 A1, owned by common assignee and herein incorporated by reference.

The feedblock also addresses process issues related to reactor fouling. For example, materials such as amphiphilic block copolymers or polymers containing highly polar segments tend to micellize and exhibit interesting and challenging solubilities and adhesion to the plug flow reactor itself. The tendency to micellize or adhere to portions of the reactor is facilitated when local environments of unusually high monomer concentrations occur such as single port entry introduction of monomer. In cases where monomer has micellized or adhered to portions of the reactor typically a very few polymer chains having a very high molecular weight are produced. These chains are less soluble in the solvent and eventually may plug the reactor. These problems are prevented with use of the feedblock as local variation in concentration is reduced or eliminated because of uniform introduction of reactants and radial mixing of the reactants into the reaction zone. The polymer chains resulting from plug flow reactors utilizing the feedblock have chains of nearly all the same length and so are less likely to display reduced solubility and fouling problem's.

An embodiment of feedblock 20 consistent with the present invention is shown in FIG. 1. Feedblock 20 is a body 22 defining a central opening 24. Body 22 is not necessarily limited to the circular or disc-like shape presented in FIG. 1, and alternatively may be modified to have other external profiles. Feedblock 20 has a first end 26 with recess 28 for connection to other portions of a plug flow reactor (not shown). Feedblock 20 similarly has a second end (not shown) with a recess (not shown) opposite of the first end 26. Central opening 24 has a cylindrical shape with a circular circumference corresponding generally to the reaction zone of a plug flow reactor. Central opening 24 of feedblock 20 may also be referred to as reaction zone 24. Reactants or other fluid materials are delivered into the feedblock 20 at inlet port 30. The reactants subsequently exit body 22 and flow into reaction zone 24 through a plurality of feed ports 32. The feed ports 32 are arranged circumferentially about reaction zone 24 in a uniform manner.

Figure 2:
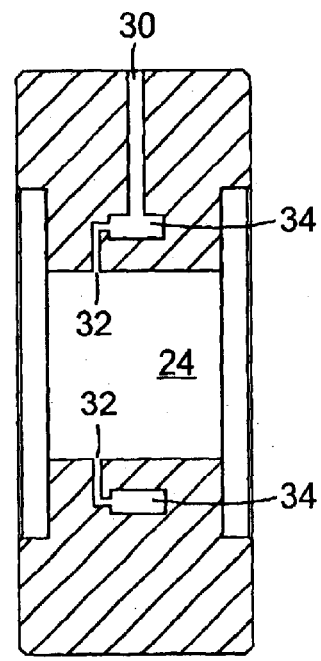
FIG. 2 is a cross-sectional view of the feedblock taken along line 2—2 in FIG. 1.

The operation of the reactant delivery system of feedblock 20 is portrayed in FIG. 2 as a cross-sectional view taken along line 2–2 of FIG. 1. Feedblock 20 is designed to introduce reactants or other materials into the reaction zone of the plug flow reactor while minimizing the radial variation in concentration. Reactants or other fluid materials are delivered into feedblock 20 through an inlet port 30. Inlet port 30 is in fluid connection with an annular-shaped manifold 34 inside of feedblock.20. Manifold 34 is concentrically oriented around reaction zone 24. The fluid materials delivered through inlet port 30 arc either pumped or otherwise pressurized so as to fill manifold 34. Manifold 34 is in fluid connection with a plurality of feed ports 32. Each feed port 32 is a narrow channel extending radially from manifold 34 to the reaction zone. The fluid materials flow from manifold 34 into substantially all feed ports 32, which are in fluid connection with reaction zone 24 resulting in reactants entering reaction zone 24 at an array of equidistant points placed to circumferentially surround the reaction zone. This uniform delivery of reactants reduces radial variation in concentration in the reaction zone 24 at the point of delivery. By feeding the monomer into the reaction zone through many holes around the circumference of the circular reaction zone rather than through a single hole, local environments within the reactor where the concentration of monomer is high are substantially eliminated. Additionally, radial mixing of the reactant into the reaction zone is facilitated.

Figure 3:
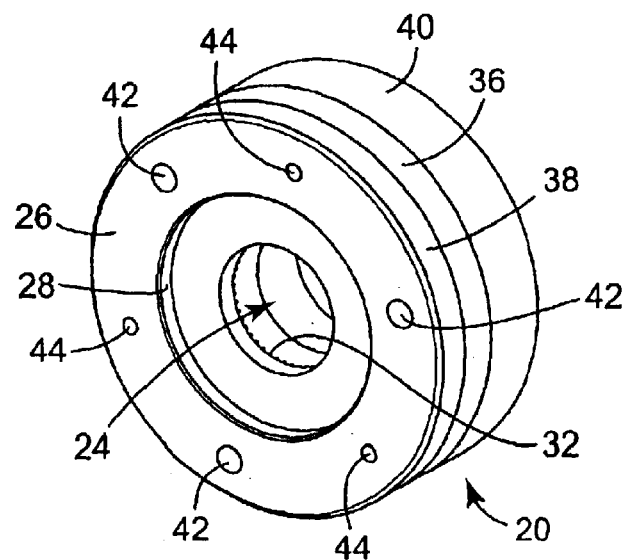
FIG. 3 is a perspective view of an alternative embodiment of the feedblock.

Feedblock 20 may alternatively be formed in multiple sections to facilitate machining in construction of the inner structure. An alternative embodiment of feedblock 20 shown in FIG. 3 is formed of three sections: a first flange 38, a main body 36, and second flange 40. The structures comprising the reactant delivery system described in the preceding paragraph are primarily formed in the main body 36. Main body 36 is sandwiched between first flange 38 and second flange 40, which serve to close the exposed openings of the reactant delivery system in main body 36. Fastening means, including but are not limited to: bolts, clamps or any combination thereof, are used to secure first flange 38, main body 36 and second flange 40 into a single unit, feedblock 20.

Typically holes 42 are located in feedblock 20, including first flange 38, main body 36 and second flange 40, to accommodate the fastening means. Additional fastening means and holes 44 are employed to attach feedblock 20 to portions of the plug flow reactor (not shown). The number of holes and method of fastening may vary. The sections are presented in further detail in FIGS. 4–9.

Figure 4:
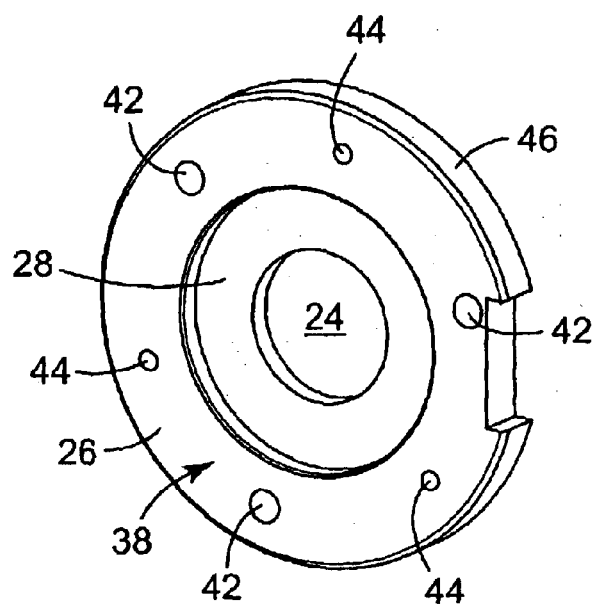
FIG. 4 is a perspective view of the first flange as seen from the outside of the feedblock.
Figure 5:
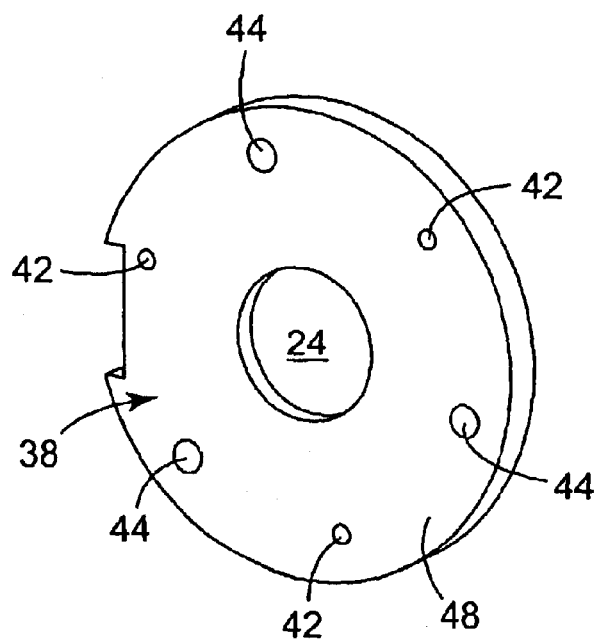
FIG. 5 is an alternative perspective view showing the inside with respect to feedblock of the first flange.

First flange 38 is shown in FIG. 4. First flange 38 includes first end 26 with recess 28 and outer edge 46. Reaction zone 24 passes through first flange 38. Recess 28 surrounds reaction zone 24 for coupling of the first flange 38 to the plug flow reactor (not shown). Recess 28 may for example receive a Teflon disc or o-ring(not shown), the disc having a central opening, to assist in sealing the connection of the reactor to first flange 38 and therefore feedblock 20. First flange 38 as shown in FIG. 4 is rotated 180° to give the perspective of in FIG. 5, which shows backing 48. Backing 48 is a predominately planar surface for contact with main body 36.

Figure 6:
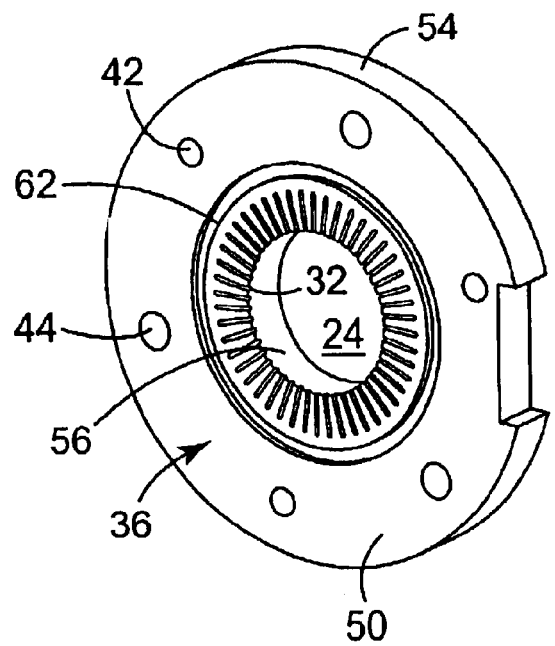
FIG. 6 is a perspective view of the portside of main body.

Main body 36, shown in FIG. 6, comprises two parallel faces, portside 50 and manifold side 52 (shown in FIG. 7 described below). Main body 36 also includes outer edge 54, inner surface 56, feed port 32, and groove 62. Main body 36 can generally be described as a ring-like structure bounded by outer edge 54 with inner surface 56 defining reaction zone 24. Portside 50 and manifold side 52 (not shown) are predominantly planar opposing faces of main body 36. Portside 50 includes a plurality of feed ports 32 and a groove 62. Groove 62 receives an 0-ring for sealing portside 50 against backing 48 of first flange 38. When portside 50 of main body 36 is compressed against backing 48, an O-ring placed in groove 62 seals against backing 48, which substantially closes the exposed channels of feed ports 32 creating a series of narrow radial passageways that connect from manifold 64 (shown in FIG. 7) into reaction zone 58.

Each feed port 32 is a channel in portside 50 such that the channel opens into inner surface 56 of main body 36. The feed ports 32 are formed in portside 50 such that the feed ports 32 are radially oriented relative to inner surface 56 and reaction zone 24. The feed ports 32 are also arranged in portside 50 such that they are equidistant from each other and are therefore uniformly distributed circumferentially around reaction zone 24.

A plurality of feed ports 32 is desired in portside 50. The minimum number of feed ports 32 is approximately 4 with the maximum number of feedports 32 being limited only by available space, machining requirements and the desired reactant flow. Approximately, twelve feed ports 32 are preferred with about 64 feed ports 32 being most preferred. Smaller plug flow reactors prefer smaller numbers of feed ports 32, while larger volume plug flow reactors prefer larger numbers of feed ports 32.

Figure 7:
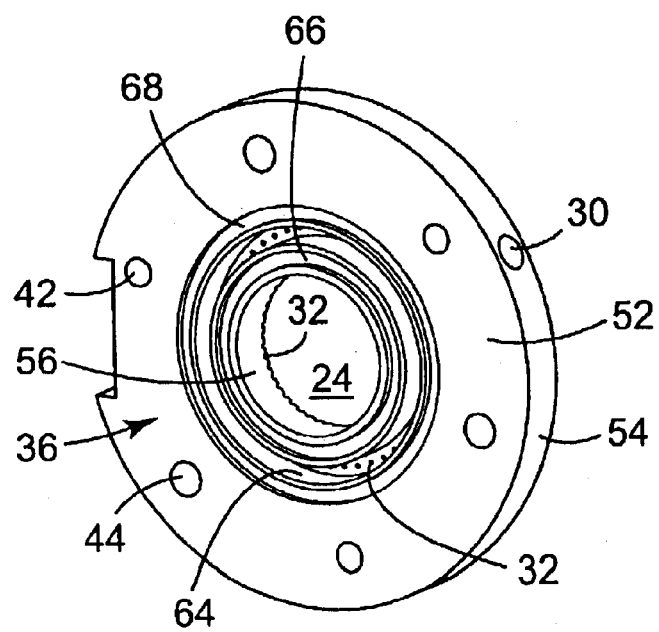
FIG. 7 is an alternative perspective view of main body as seen from the manifold side.

The perspective of main body 36 is reversed in FIG. 7 so that manifold side 52 is visible. Manifold side 52 includes manifold 64, inner groove 66, outer groove 68 and inlet port 30. Manifold 64 is an annular recess in the substantially planar manifold side 52. Openings into feed ports 32 are visible inside manifold 64. Inlet port 30 extends from outer edge 54 into manifold 64. Main body 36 may alternatively include a plurality of inlet ports 30 with access to manifold 64 when high flow rates are needed. Inner groove 66 and outer groove 68 each receive an O-ring such that when manifold side 52 of main body 36 is pressed against backing 70 (described below) of second flange 40, manifold 64 is completed to create an annular space.

Figure 8:
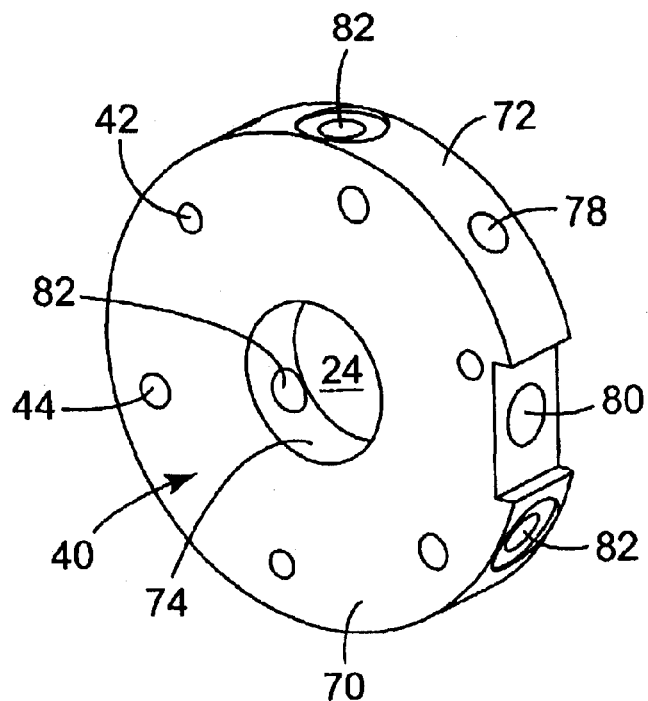
FIG. 8 is a perspective view of the inside of second flange.

Second flange 40 is shown in FIG. 8. Second flange 40 has a ring-like shape defined by outer edge 72, inner surface 74, backing 70, and second end 76 (not shown). Second flange 40, as shown in FIG. 8, has increased thickness to accommodate additional optional inlet ports 78 which pass from, outer edge 72 through second flange 40 into inner surface 74 for access to the reaction zone 24. These inlet ports 78 have various purposes including: to withdraw samples; access for a thermal couple or other monitoring equipment; a plurality of holes, typically three uniformly distributed holes, for shaft alignment pins to support a mixing shaft (not shown); and single point inlet ports for introduction of reactants or solvents, or removal of products or reaction samples. In FIG. 8, second flange 40 has several single point inlet ports including a sample withdrawal port 80, three holes 82 (two of which are visible in outer edge 72 and the third which is visible on inner surface 74) for shaft alignment pins (not shown), and at least one access port 78 that may be used for thermal couple or other access to reaction zone 24. Backing 70 of second flange 40 is primarily planar so as to seal against the manifold side 52 of main body 36.

Figure 9:
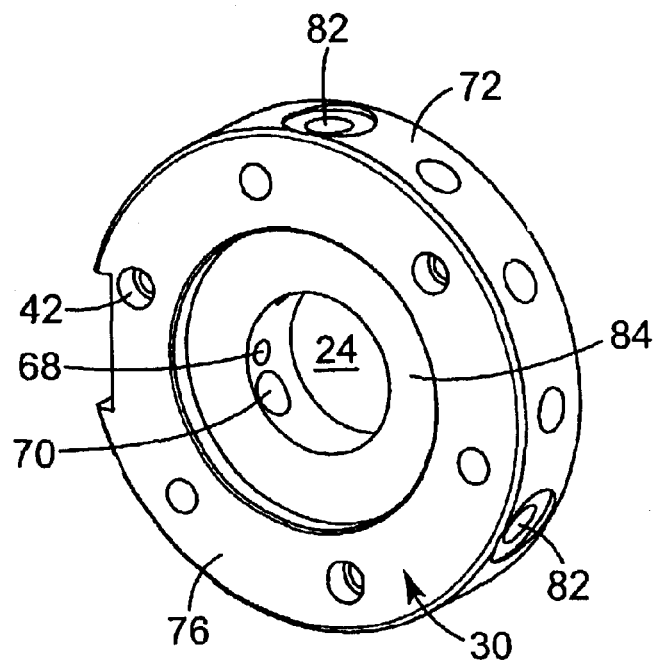
FIG. 9 is an alternative perspective view of second flange viewed from the outside of the feedblock.

Second end 76 of second flange 40 is shown in further detail in the reversed perspective of FIG. 9. Second end 76 includes recess 84 and holes 42 and holes 44. Recess 84 assists attachment of second flange 40 to the plug flow reactor (not shown). Typically an O-ring of Teflon or other material used to assist in sealing will be placed in recess 84 for contact with other portions of the plug flow reactor (not shown).

As noted above, second flange 40 has increased thickness to accommodate additional ports for access to the reaction zone. These ports are optional and may not be necessary in all plug flow reactors including feedblock 20. Where these ports, including: inlet port 78, sample withdrawal port 80, shaft pin holes 82, are eliminated; second flange 40 may have decreased thickness. Alternatively, first flange 38 may be increased in thickness to accommodate additional ports as described in second flange 40.

Plug Flow Reactor

The feedblock and method of the present invention is generally compatible with any plug flow reactor. The plug flow reactor may be any apparatus that allows materials to pass through it in a plug flow manner, for example, a stirred tube reactor, an extruder, a static mixer, or any combination in series. "Plug flow reactor (PFR)" means a reactor that ideally operates without axial mixing (see An Introduction to Chemical Engineering Kinetics and Reactor Design; Charles G. Hill J. Wiley and Sons 1977, p. 251). A plug flow reactor is able to impel, from the input end of reactor to its output end, in an essentially plug flow manner, the reaction mixture contained therein. "Essentially plug flow" means that eddies and dead spots, where reaction mixture can be delayed in its path through reactor and short circuits to the reactor outlet, which allow the reaction mixture to pass too quickly through reactor, are virtually nonexistent. This means that a "plug" (a theoretical slice of a reaction mixture cut in a direction perpendicular to the overall direction of flow in a reactor) continues down the length of plug flow reactor with about the same velocity profile as a plug traveling through the reactor either earlier or later in time. The manner in which a reaction mixture is impelled through plug flow reactor can be by an external means such as a pressure feed, for example a pump, or by an internal means, for example a screw in an extruder. Plug flow can be assisted by lateral mixing means, for example, radial paddles in a stirred tubular reactor (STR).

One example of a plug flow reactor is a stirred tubular reactor (STR), which consists of a series of cylinders joined together to form a tube. The ability to add reagents at numerous points along the reaction, pathway in a STR makes the STR well suited for controlled architecture reactions. Down the center of this tube, the STR typically has a shaft having a plurality of paddles radiating therefrom. An external drive rotates the shaft causing the paddles to stir the reaction mixture and assist in heat transfer. In addition, the paddles are commonly designed such that they assist the pumps and/or pressure feed systems in propelling the reaction mixture through the STR.

STRs are described as examples of plug flow reactors, and are meant to be merely illustrative. Objects, and advantages of this invention are further illustrated by the following examples. The particular materials and amounts thereof, as well as other conditions and details, recited in these examples should not be used to unduly limit this invention.

EXAMPLES

The use of the feedblock and method of reactant delivery in a plug flow reactor is demonstrated in the following examples. The feedblock is incorporated in a STR used for living anionic polymerizations of block co-polymers. "Living anionic polymerization" means, in general, a chain polymerization reaction that proceeds via an anionic mechanism without chain termination or chain transfer. (For a more complete discussion of this topic, see Anionic Polymerization Principles and Applications. H. L. Hsieh, R. P. Quirk, Marcel Dekker, New York, N.Y. 1996. Pg 72–127).

In a living polymerization, each polymer chain has a reactive site, called a "living end", for further addition of monomer. Living polymerization reactions can be used to form different morphologies including portions of a polymer chain in which all the neighboring monomer units (except at the transition point) are of the same identity, also called a "block". For example, AAAAAABBBBBB is a diblock copolymer comprised of A and B monomer units. For further information regarding the use of plug flow reactors for anionic polymerizations, including living anionic polymerizations, and formation of various controlled architectures, see U.S. Pat. No. 6,448,353 owned by common assignee and herein incorporated by reference.

Continuous temperature controlled anionic polymerization processes for the synthesis of controlled architecture materials, such as those described in U.S. Pat. No. 6,448,353, typically produce polymers with polydispersities of 1.5–2.5. In these systems, monomers and catalyst arc added at a single location in 3-dimensional (D) space, thus creating a local environment where there is an unusually high content of monomer resulting in a concentration gradient in 3D space. This broadens the polydispersity of the overall 3D slice of material in a plug flow reactor because some chains grow at faster rates than others due to concentration differences. The feedblock and method of the present invention improves (lowers) the polydispersity of these reactions by reducing concentration gradients.

Test Methods
Molecular Weight and Polydispersity

The average molecular weight and polydispersity of a sample was determined by Gel Permeation Chromatography (GPC) analysis. Approximately 25 mg of a sample was dissolved in 10 milliliters (mL) of tetrahydrofuran (THF) to form a mixture. The mixture was filtered using a 0.2 micron polytetrafluoroethylene (PTFE) syringe filter. Then about 150 microliters ($\mu$L) of the filtered solution was injected into a Plgel-Mixed B column (available from Polymer Laboratories, Amherst, Mass.) that was part of a GPC system also having a Waters® 717 Autosampler and a Waters® 590 Pump (available from Waters Corporation, Milford, Mass.). The system operated at room temperature, with a THF eluent that moved at a flow rate of approximately 0.95 mL/min. An Erma ERC-7525A Refractive Index Detector (available from JM Science Inc. Grand Island, N.Y.) was used to detect changes in concentration. Number average molecular weight ($M_n$) and polydispersity index (PDI) calculations were based on a calibration mode that used narrow polydispersity polystyrene controls ranging in molecular weight from $6 \times 10^6$ to $600 \times 10_6$. The actual calculations were made with PL Calibers software available from Polymer Laboratories, Amherst, Mass.

Block Concentration

The concentration of different blocks in a block copolymer was determined by Nuclear Magnetic Resonance (NMR) spectroscopy analysis. A sample was dissolved in deuterated chloroform to a concentration of about 10 weight % and placed in a Unity® 500 MHz NMR Spectrometer available from Varian Inc., Palo Alto, Calif. Block concentrations were calculated from relative areas of characteristic block component spectra.

TABLE 1

Materials Used

| Material | Description |
|---|---|
| Isoprene | Available from Aldrich Chemical Co., Milwaukee, WI. |
| Styrene | Available from Ashland Chemical, Columbus, OH. |
| t-Butyl methacrylate | Available from Sans Esters Corp., New York, NY. |
| Diphenylethylene | Available from Acros/Fisher Scientific, Itasca, IL. |
| Sec-Butyl lithium | Available from Aldrich Chemical Co., Milwaukee, WI 1.3 Molar in cyclohexane. |
| Toluene | Available from Worum Chemical, St. Paul, MN |
| Tetrahydrofuran (THF) | Available from ISP Technologies, Wayne, NY. |
| Cyclohexane | Available from Ashland Chemical, Columbus, OH. |

Monomer Preparation and Handling

The reactant monomers in the examples (isoprene, styrene, t-butyl methacrylate, and diphenylethylene were nitrogen sparged until the $O_2$ concentration was less than 1 part per million (ppm). Deoxygenated monomer was pumped through a column (l=50 cm, d=2 cm) of basic alumina ($Al_2O_3$, activated, acidic, Brockmann I, about 150 mesh, Sigma-Aldrich Fine Chemicals, Milwaukee, Wis.). The purified monomer was then fed directly to the first zone of a stirred tubular reactor (STR) when used for the initial block, or at a later zone of the STR for a subsequent block formation. Reaction solvents (either toluene, cyclohexane or a mixture) were pumped through molecular sieve beads (available as Zeolite 3A from UOP LLC, Des Plaines, Ill.) and fed directly to the STR. In isoprene-based examples where a THF co-solvent was used, the THF also was deoxygenated by nitrogen sparging for 30 minutes and purified by pumping through both 3A molecular sieve beads (available as Zeolite 3A, UOP LLC, Des Plaines, Ill.) and a column of alumina (available as $Al_2O_3$, activated, acidic, Brockmann I, about 150 mesh, Sigma-Aldrich Fine Chemicals, Milwaukee, Wis.). The THF stream was then fed to the STR in the same zone as the isoprene or one zone after the isoprene feed point. Sec-butyl lithium initiator(1.3 Molar (M) sec-butyl lithium in cyclohexane) was diluted by addition of pre-purified cyclohexane and was added to the first zone of the STR.

Pumps were used to deliver the monomers, solvents, and initiators to the reactor. Typical pumps for this application are reciprocating piston pumps, models QG50 and QG150 from Fluid Metering Inc. Syosset, N.Y. Pressure feeding the materials from pressurized vessels is another viable method, but requires more sophisticated backpressure regulation or badger valves to achieve accurate flowrates, such as a Brooks® Quantim® low flow coriolis mass flow controllers (Brooks Instrument, Hatfield Pa.).

STR Descriptions 3.3 L Glass STR

One example stirred tubular reactor (STR) had a reaction zone capacity of 3.33 L and consisted of five jacketed (shell-and-tube) glass sections (Pyrex® cylinders). The tube had an inner diameter of 4.13 cm and an outer diameter of 5.08 in. The shell had a diameter of 8.89 cm. The STR had five sections, the first and third zones were 60.96 cm long, the sections for the second and fourth zones were 30.48 cm long, and the section for the fifth zone was 68.58 cm long. The sections were joined together with stainless steel connector disks. A feedblock consistent with the present invention Was placed as a connector disk between the fourth and fifth zone. The feedblock had 12 feed ports in the mainbody for the introduction of monomers into the reaction zone of the reactor through 12 points around the circumference, in a circular fashion. The feedblock additionally had a single point inlet port in the second flange for purposes of comparison of products. The STR was closed off at both ends with stainless steel disks.

The connector disks were equipped with individual temperature sensing devices extending into the interior of the cylindrical sections. These temperature-sensing devices permitted the temperature of the reaction mixture in each section to be monitored and adjusted up or down (as necessary) to, a set point by varying the temperature of the heat transfer fluid flowing through the jacketed sections.

Extending through the center of the joined cylinders was a 0.95 cm diameter stainless steel shaft suspended along the cylinder axis by shaft alignment pins. To the shaft were affixed 60 detachable stainless steel paddles with approximately 2.1 cm between each paddle. The rectangular paddles were 3.2 mm thick, 1.91 cm wide, and 3.81 cm long. The paddle configuration used was as follows; in zone 1, 14 rectangular paddles; in zone 2, seven rectangular paddles; in zone 3, 14 rectangular paddles; in zone 4, seven rectangular paddles; and in zone 5, 18 rectangular paddles. The shaft was attached to a 2.2 kW variable speed motor and driven at approximately 150 rpm .

0.94 L Glass STR

A second example STR had a reaction zone capacity of 0.94 L and consisted of five jacketed (shell-and-tube) glass sections (Pyrex® cylinders). The tube had an inner diameter of 3.01 cm and an outer diameter of 3.81 cm. The shell had a diameter of 6.4 cm. All five sections, corresponding to zones 1–5, were 25.4 cm long. The sections were joined together by stainless steel coupling disks. The coupling disks were equipped with individual temperature sensing thermocouples extending into the interior of the cylindrical sections. These thermocouples permitted the temperature of the reaction mixture in each section to be monitored and adjusted up or down (as necessary) to a set point by varying the temperature of the heat transfer fluid flowing through the jacketed sections. The coupling disks also contained various single inlet ports through which monomer or solvent could be added into the reaction mixture. The coupling disk located between the fourth and fifth zones was designed in such a way that the monomer would enter the disk, fill a circumferential chamber inside the disk, and then enter the reactor through 12 points equally spaced around the center of the reactor. The disk positioned at the beginning of the first zone was designed in a similar fashion with the ability to feed monomer into the reactor through 12 equally spaced holes around the circumference of the reactor.

Extending through the center of the joined cylinders was a stainless steel shaft with a length 132.9 cm and a diameter of 0.95 cm. The shaft was suspended along the cylinder axis by shaft alignment pins. Thirty detachable stainless steel paddles with approximately 2.1 cm between each paddle were affixed to the shaft. The rectangular paddles were 1.6 mm thick, 1.91 cm wide, and 2.32 cm long. Each zone contained six paddles. The shaft was attached to a variable speed, ¼ hp Baldor® industrial gear motor (Baldor® Industrial Motor, Ft. Smith, Ark.) with a torque of 3.6 Nm. The stir rate was controlled at approximately 150 rpm. An external seal, typically a Chesterton® 440 seal (A.W. Chesterton, Colo., Stoneham, Mass.) is used to seal the front end of the reactor.

Heat transfer was accomplished by attaching recirculators to the jackets. All zones were heated or cooled with water. They were all independently heated or cooled except zones 2 and 3, which were heated/cooled in series from the same recirculator. Zone 1 was heated/cooled in a co-current manner while the other four zones were heated/cooled in a countercurrent fashion. Typical heat transfer fluids include but are not limited to oil, water, or HFE 7100 (available from 3M Corporation, St. Paul, Minn.) and are chosen based on the desired temperature range needed. A typical heating/cooling bath for most anionic polymerizations is the Julabo™ FP50 (Julabo USA, Inc., Allentown, Pa.). It is ideal to have one unit dedicated to each section, but at times it is possible to have multiple sections connected in series to the same heat transfer unit.

Temperatures in the reactor can be monitored and recorded through use of a thermocouple temperature recorder (OCTTEMP 8-channel recorder, Omega Engineering, Inc. Stamford, Conn.) and accompanying software interfaced with a personal computer. Thermocouples (type J) are positioned in each of the stainless steel coupling pieces to provide zone batch temperatures during polymerizations.

Example 1

Poly(styrene-t-butyl methacrylate) Block Copolymer—3.3 L STR

This example illustrates the effect of introducing a monomer into the reactor at twelve points equally spaced around the circumference has on the polydispersity index. A comparison will be made whereby all the reactor and reaction conditions are constant from sample to sample except for the method of introducing the monomer into the reactor.

An initiator slurry was prepared by mixing 320 g of 1.3 M sec-butyl lithium in cyclohexane with 4000 g of oxygen-free cyclohexane and stirred at room temperature for about 30 minutes. Purified styrene monomer and purified cyclohexane solvent were fed into the first zone of the STR via reciprocating piston pump. The initiator slurry was introduced by peristaltic pump into zone 1 of the STR as well. A color change from clear to red was observed in zone 1 when the initiator solution contacted the monomer, and an exotherm resulted. The reaction temperature was kept at about 53° C. by adjusting the jacket temperature of zone 1 to 58°

C. The temperature of the reaction mixture in each of the 5 zones of the STR was individually maintained at: #1=53° C., #2=42° C., #3=28° C., #4=28° C., and #5=20° C.

The materials flowed through the first three zones, facilitated by stirring paddles along the reaction path. Polymerization continued to essentially 100% completion by the end of zone 3, thereby forming a "living" polystyrene polymer mixture. At the start of, zone 4, purified diphenylethylene (DPE) was fed via reciprocating piston pump to the "living" polystyrene reactive mixture, resulting in a slight color change, from red to a deeper red, indicating that a reaction had occurred with the DPE and the "living" polystyrene polymer. At the beginning of zone 5, purified t-butyl methacrylate (tBMA) was fed via reciprocating piston pump to the "living" polymer solution, resulting in a color change from deep red to white indicative of "living" polytBMA polymer. The tBMA feed was alternated between 12 points around the circumference using a feedblock consistent with the present invention and 1 point using a single inlet port to produce sample product for each combination of feed method and set of flowrates. The resulting poly(styrene-tBMA) block copolymer was quenched with deoxygenated methanol and samples were collected for analysis. The flowrates of all the raw materials were varied during the run and are listed in Table 2. The total residence time for these reactions was about 20 minutes.

Each sample was tested for number average molecular weight (Mn), polydispersity index (PDI) and relative concentration of polystyrene to t-butyl methacrylate. Results are shown in Table 3.

g of 1.3 M sec-butyl lithium in cyclohexane with 3000 g of oxygen-free cyclohexane and stirred at room temperature for about 30 minutes. Purified styrene monomer (5.9 g/min), purified toluene solvent (9.6 g/min), and the initiator slurry (5.5 g/min) were fed into the STR at the beginning of the first zone. The styrene was fed into the reactor through 12 points equally spaced around the circumference of the tube. A color change from clear to red was observed in zone 1 when the initiator solution contacted the monomer. The reaction temperature in the first zone was kept at about 50° C. by adjusting the jacket temperature of zone 1 to 60° C.

The materials flowed through the first two zones, facilitated by stirring paddles along the reaction path. Polymerization continued to essentially 100% completion by the end of zone 2, thereby forming a "living" polystyrene solution. Purified isoprene monomer was fed into the reactor (5.9 g/min) at the beginning of zone 3. A color change from red to clear resulted. Purified THF was fed into the reactor (0.7 g/min) at the beginning of Zone 4. A color change from clear to yellow resulted and an exotherm was observed. The jacket temperatures were maintained at: #1=60° C., #2=46° C., #3=46° C., #4=60° C., #5=60° C. The resulting poly(styrene-isoprene) block copolymer was quenched with deoxygenated methanol and samples were-collected for analysis. The . flowrates of all the raw materials were held constant throughout the run (6 hours). The total residence time for this reaction was about 32 minutes and the, reaction was carried-out at 43% solids.

Each sample was tested for number average molecular weight (Mn), polydispersity index (PDI) and relative con-

TABLE 2

Analytical Results for PS-tBMA Block Copolymers

| Sample | tBMA Entry points | Cyclohexane g/min | BuLi g/min | Styrene g/min | DPE g/min | TBMA g/min | PS mol % | tBMA mol % | Mn g/mol × 10⁴ | Mw g/mol × 10⁴ | PDI |
|---|---|---|---|---|---|---|---|---|---|---|---|
| 1A | 12 | 80.0 | 10.0 | 25 | 9.2 | 10.1 | 76.6 | 23.4 | 5.72 | 8.11 | 1.42 |
| 1B | 1 | 80.0 | 10.0 | 25 | 9.2 | 10.1 | 67.3 | 32.7 | 5.01 | 7.52 | 1.50 |
| 2A | 12 | 80.0 | 10.0 | 25 | 9.2 | 12.1 | 66.8 | 33.2 | 6.22 | 8.25 | 1.33 |
| 2B | 1 | 80.0 | 10.0 | 25 | 9.2 | 12.1 | 70.3 | 29.7 | 4.76 | 7.20 | 1.51 |
| 3A | 12 | 80.0 | 10.0 | 25 | 9.2 | 16.1 | 65.3 | 34.7 | 7.34 | 9.74 | 1.33 |
| 3B | 1 | 80.0 | 10.0 | 25 | 9.2 | 16.1 | 66.3 | 33.7 | 7.45 | 10.42 | 1.40 |
| 4A | 12 | 80.0 | 10.0 | 25 | 9.2 | 18.1 | 65.1 | 34.9 | 7.11 | 9.84 | 1.38 |
| 4B | 1 | 80.0 | 10.0 | 25 | 9.2 | 18.1 | 60.4 | 39.6 | 6.83 | 10.77 | 1.58 |
| 5A | 12 | 80.0 | 10.0 | 25 | 9.2 | 20.1 | 64.8 | 35.2 | 6.45 | 9.44 | 1.46 |
| 5B | 1 | 80.0 | 10.0 | 25 | 9.2 | 20.1 | 62.3 | 37.7 | 6.61 | 10.11 | 1.53 |
| 6A | 12 | 80.0 | 10.0 | 34 | 9.2 | 20.1 | 66.5 | 33.4 | 8.72 | 12.15 | 1.39 |
| 6B | 1 | 80.0 | 10.0 | 34 | 9.2 | 20.1 | 68.2 | 31.7 | 8.82 | 12.85 | 1.46 |

Example 2

Poly(styrene-isoprene) Block Copolymer—0.9 L STR

This example illustrates the effect of introducing a monomer into the reactor at twelve points equally spaced around the circumference has on the polydispersity index. In this example the monomer for the first block is fed into the reactor through 12 points around the circumference of the STR. This demonstrates a typical polydispersity attained with this device.

In this example, all materials were fed from pressure vessels maintained at 50 psi by nitrogen. The feed rates were all controlled with Brooks® Quantim® low flow coriolis mass flow controllers, available from Brooks Instrument, Hatsfield, Pa. An initiator slurry was prepared by mixing 100 centrations of polystyrene to polyisoprene. Results are shown in Table 3.

TABLE 3

Analytical Results for PS-PI Block Copolymers

| Sample | Mn g/mol × 10⁴ | Mw g/mol × 10⁴ | PDI | PS mol % | 1,2 PI mol % | 1,4 PI mol % | 3,4 PI mol % |
|---|---|---|---|---|---|---|---|
| 2A | 3.98 | 4.87 | 1.22 | 41.3 | 0.0 | 51.9 | 6.8 |
| 2B | 4.10 | 4.87 | 1.19 | 40.4 | 0.6 | 50.3 | 8.7 |
| 2C | 3.98 | 4.76 | 1.20 | 41.4 | 0.7 | 48.7 | 9.2 |
| 2D | 3.95 | 4.75 | 1.20 | 42.3 | 0.6 | 47.6 | 9.5 |
| 2E | 3.83 | 4.79 | 1.25 | 42.3 | 1.0 | 42.3 | 14.3 |
| 2F | 3.95 | 4.81 | 1.22 | 42.1 | 1.9 | 34.5 | 21.5 |

TABLE 3-continued

Analytical Results for PS-PI Block Copolymers

| Sample | Mn g/mol × $10^4$ | Mw g/mol × $10^4$ | PDI | PS mol % | 1,2 PI mol % | 1,4 PI mol % | 3,4 PI mol % |
|---|---|---|---|---|---|---|---|
| 2G | 3.81 | 4.72 | 1.24 | 42.2 | 1.5 | 38.4 | 17.9 |
| 2H | 4.06 | 4.92 | 1.21 | 40.7 | 2.3 | 33.0 | 23.9 |

Example 3

Poly(styrene-t-butyl methacrylate) Block Copolymer—0.9 L STR

This example illustrates the effect introducing a monomer into the reactor at twelve points equally spaced around the circumference has on reactor fouling and on the polydispersity index. In this example, poly(styrene-t-butyl methacrylate) block copolymer was produced by feeding the monomer for the first block of the polymer(styrene) into the reactor using a feedblock with 12 feed ports and by feeding the monomer for this second block (t-butyl methacrylate) through a second feedblock with 12 feed ports between zones 4 and 5. This product is produced for 3 hours, and then the feed of the second monomer was changed to a single point inlet port to produce a comparison (control) product for an additional 3 hours.

In this example, all materials were fed from pressure vessels maintained at 50 psi by nitrogen. The feed rates were all controlled with Brooks® Quantim® low flow coriolis mass flow controllers, available from Brooks Instrument, Hatsfield, Pa. Initiator slurry was prepared by mixing 63 g of 1.4 M sec-butyl lithium in cyclohexane with 3000 g of oxygen-free cyclohexane and stirred at room temperature for about 30 minutes. Purified styrene monomer (6.1 g/min), purified cyclohexane solvent (12.3 g/min), and the initiator slurry (5.5 g/min) were fed into the STR at the beginning of the first zone. The styrene was fed into the reactor through 12 points equally spaced around the circumference of the tube. A color change from clear to red was observed in zone 1 when the initiator solution contacted the monomer. The reaction temperature in the first zone was kept at about 60° C. by adjusting the jacket temperature of zone 1 to 60° C. The temperature of the reaction mixture in each of the 5 zones of the STR was individually maintained at: #1=60° C., #2=45° C., #3=36° C., #4=34° C., and #5=38° C.

The materials flowed through the first three zones, facilitated by stirring paddles along the reaction path. Polymerization continued to essentially 100% completion by the end of zone 3, thereby forming a "living" polystyrene polymer mixture. At the start of zone 4, purified diphenylethylene (DPE) was fed via reciprocating piston pump to the "living" polystyrene reactive mixture, resulting in a slight color change, from red to a deeper red, indicating that a reaction had occurred with the DPE and the "living" polystyrene polymer. The DPE is introduced to modify the "living" polymer chain ends to induce more efficient methacrylate initiation to prevent reduce side reactions such as chain transfer, backbiting, and termination.

At the beginning of zone 5, purified t-butyl methacrylate (tBMA) was fed via reciprocating piston pump to the "living" polymer solution, resulting in a color change from deep red to white indicative of "living" polytBMA. The tBMA was fed into the reactor through 12 feed ports of the feedblock for 3 hours thereby producing product by the method of the present invention. The method of monomer deliver was switched to a single inlet for another 3 hours and an additional product was collected. The resulting poly (styrene-tBMA) block copolymer was quenched with deoxygenated methanol and samples were collected for analysis. The total residence time for these reactions was about 25 minutes.

Each sample was tested for number average molecular weight (Mn), polydispersity index (PDI) and relative concentration of polystyrene to t-butyl methacrylate. Representative results are shown in Table 4.

TABLE 4

Analytical Results for PS-tBMA Block Copolymers

| Sample | TBMA Entry Points | Mn g/mol × $10^4$ | Mw g/mol × $10^4$ | PDI | PS mol % | TBMA mol % |
|---|---|---|---|---|---|---|
| 3A | 12 | 5.03 | 9.44 | 1.88 | 67.8 | 32.2 |
| 3B | 1 | 5.59 | 19.3 | 3.44 | 66.7 | 33.3 |

While the PS-tBMA block copolymer was being synthesized, pressures in the reactor were recorded as a means of quantifying reactor fouling. As the reactor fouls, polymer precipitates out of solution and adheres to the reactor wall and the stirring paddles. This causes a polymer obstruction that in turn creates an overall pressure increase in the reactor. During the synthesis using the tBMA feed through, 12 feed ports, no pressure increase and no polymer build-up was observed. While feeding the tBMA into the reactor through 1 point, the same polymer rapidly became insoluble and began to foul the reactor. With this setting, a pressure of 7 psi was observed.

The samples collected from feeding tBMA into the reactor through one point displayed bimodal behavior in the GPC analysis. Further analysis of a polymer sample was done to determine the makeup of this higher molecular weight peak. A GPC sample was fractionated and the different fractions were analyzed via NMR. The results show that there is not a uniform distribution of tBMA to all polymer chains in the polymer produced by single inlet monomer feed. Some of the polymer chains had much more tBMA than the average and as such became insoluble. The results are shown in Table 5.

TABLE 5

NMR Analysis for PS-tBMA Block Copolymer Fractions

| Sample | PS mol % | TBMA mol % |
|---|---|---|
| 3B (Overall Sample) | 66.7 | 33.3 |
| 4A (Main Peak) | 71.8 | 28.2 |
| 4B (Higher MW "shoulder") | 44.6 | 55.4 |

Various modifications and alterations that do not depart from the scope and spirit of this invention will become apparent to those skilled in the art. This invention is not to be unduly limited to the illustrative embodiments set forth herein.

What is claimed is:

1. A device for providing a reactant to a reaction zone in a plug flow reactor, the device comprising:

a feedblock configured to substantially encircle the reaction zone;

an inlet port providing entry of the reactant into the feedblock;

a manifold disposed within the feedblock and in fluid connection with the inlet port; and a plurality of reactant feed ports disposed in the feedblock for delivering reactant to the reaction zone and fluidly connected with the manifold such that the reactant is delivered to the reactant feed ports.

2. The device of claim 1 wherein the plurality of uniformly distributed feed ports are disposed around the reaction zone in a substantially equidistant manner.

3. The device of claim 2 wherein the manifold is an annular chamber extending circumferentially through the main body.

4. The device of claim 1 having at least 4 feed ports.

5. The device of claim 1 having at least 12 feed ports.

6. The device of claim 1 wherein the feedblock includes a first flange portion, a mainbody, and a second flange portion wherein the central portion provides fluid contact of the feed ports with the reaction zone and the first and second flange sections provide for fluid connection with the plug flow reactor.

7. A plug flow reactor comprising:

a plug flow reactor chamber;

a reactant feedblock in fluid connection with the plug flow reactor chamber wherein the feedblock includes a plurality of substantially uniformly spaced circumferentially distributed reactant feed ports disposed to provide a reactant to the reactor chamber and a manifold disposed within the feedblock and fluidly connected with the feed ports for distributing reactant to the feed ports.

8. The plug flow reactor of claim 7 wherein the reactant feedblock includes an inlet feed port fluidly connected to the manifold.

9. The plug flow reactor of claim 7 including a plurality of spaced-apart feedblocks disposed along the reactor chamber, wherein the reactant feed ports of each feedblock are disposed for providing reactant into the reactor chamber.

10. The plug flow reactor of claim 7 including a plurality of feedblocks disposed in an adjacent manner along the reactor chamber wherein the feed ports of each feedblock are disposed to provide reactant into the reactor chamber.

* * * * *

UNITED STATES PATENT AND TRADEMARK OFFICE
CERTIFICATE OF CORRECTION

PATENT NO. : 6,969,490 B2
APPLICATION NO. : 10/606916
DATED : November 29, 2005
INVENTOR(S) : Ryan E. Marx It is certified that error appears in the above-identified patent and that said Letters Patent is hereby corrected as shown below:

Col. 1
Line 50, after "copolymer" delete "," and insert -- ; --, therefor.

Col. 3
Line 67, delete "problem's" and insert -- problems --, therefor.

Col. 4
Line 26, delete "feedblock.20" and insert -- feedblock 20 --, therefor.
Line 28, delete "arc" and insert -- are --, therefor.

Col. 5
Line 20, delete "0-ring" and insert -- O-ring --, therefor.
Line 38, delete "feedports" and insert -- feed ports --, therefor.
Line 62, after "from" delete ",".

Col. 6
Line 5, after "including" insert -- : --.
Line 45, after "reactor" insert -- , --.
Line 62, after "reaction" delete ",".

Col. 7
Line 5, after "Objects" delete ",".
Line 40, delete "arc" and insert -- are --, therefor.

Col. 8
Line 5, delete "600x10$_6$" and insert -- 600x10$^6$ --, therefor.
Line 6, delete "Calibers" and insert -- Caliber$^®$ --, therefor.
Line 43, delete "1=50" and insert -- I=50 --, therefor.

Col. 9
Line 21, delete "Was" and insert -- was --, therefor.
Line 34, after "to" delete ",".

Col. 11
Line 8, after "of" delete ",".

Col. 12
Line 24, delete "were-collected" and insert -- were collected --, therefor.
Line 25, after "the" delete ".".
Line 27, after "the" delete ",".
Line 28, delete "carried-out" and insert -- carried out --, therefor.

UNITED STATES PATENT AND TRADEMARK OFFICE
CERTIFICATE OF CORRECTION

PATENT NO. : 6,969,490 B2
APPLICATION NO. : 10/606916
DATED : November 29, 2005
INVENTOR(S) : Ryan E. Marx It is certified that error appears in the above-identified patent and that said Letters Patent is hereby corrected as shown below:

Col. 13
Line 60, delete "prevent reduce" and insert -- prevent/reduce --, therefor.

Col. 14
Line 31, after "through" delete ",".

Signed and Sealed this

Eleventh Day of September, 2007

JON W. DUDAS
*Director of the United States Patent and Trademark Office*